United States Patent [19]

Dumestre, III

[11] Patent Number: 4,879,719
[45] Date of Patent: Nov. 7, 1989

[54] LATCHING MECHANISM

[75] Inventor: Alex C. Dumestre, III, Covington, La.

[73] Assignee: Western Atlas International, Inc., Houston, Tex.

[21] Appl. No.: 157,298

[22] Filed: Feb. 17, 1988

[51] Int. Cl.⁴ .............................................. G01V 1/38
[52] U.S. Cl. ...................................... 367/20; 367/16; 367/154; 114/249
[58] Field of Search ................. 367/161, 20, 130, 153, 367/154, 177; 181/110; 114/254, 249

[56] References Cited

U.S. PATENT DOCUMENTS

| | | | |
|---|---|---|---|
| 808,486 | 12/1905 | Spencer | 49/339 |
| 1,804,908 | 5/1931 | Wichert | 49/339 |
| 3,931,608 | 1/1976 | Cole | 367/17 |
| 4,290,124 | 9/1981 | Cole | 367/16 |
| 4,394,101 | 7/1983 | Richer | 403/348 |
| 4,426,098 | 1/1984 | Kalmanson | 403/323 |
| 4,500,980 | 2/1985 | Copeland | 339/47 R |
| 4,611,171 | 9/1986 | Woods | 367/19 |
| 4,644,506 | 2/1987 | Cretin et al. | 367/19 |
| 4,709,355 | 11/1987 | Woods et al. | 114/245 |

FOREIGN PATENT DOCUMENTS 2445461 8/1980 France ................. 403/323

Primary Examiner—Nelson Moskowitz
Attorney, Agent, or Firm—Barry C. Kane

[57] ABSTRACT

A latching mechanism used to couple external devices to marine seismic streamer cables is disclosed. The latching device universally couples to collars predominantly used in the seismic industry. A mounting bracket or shank is provided which is coupled to the external device. The shank has a lug or finger fixed therein which extends from a mounting surface. Adjacent the lug is a latching device which is comprised of a cylinder having a cam defined at the upper end. The cylinder is recessed within the shank so that the cam and the lug are engaged with an aperture defined in the collars attached to the streamer cable. A lever extends from the cylinder through the exterior of the shank so that an operator may rotate the cylinder, turning the cam in the aperture to a locking position. A spring applies a tensile force to the cylinder, drawing the cam down against the aperature, and pulling the shank tight against the collar. The shank and external device may be uncoupled by simply rotating the lever in the opposite direction which disengages the cam with the aperature, allowing the cam and lug to fall free from the collar. The instant invention provides a device which does not require tools to couple, uncouple or adjust the mechanism. Another advantage is that debris cannot accidentally uncouple the mechanism. Additionally, the design provides a streamline, low noise coupling device.

18 Claims, 3 Drawing Sheets

LATCHING MECHANISM

BACKGROUND OF THE INVENTION

1. Field of the Invention

This invention relates to coupling devices and particularly to an apparatus for coupling external equipment to a seismic streamer cable.

2. Discussion of the Related Art

In the art of marine seismic exploration, it has been generally recognized that it is important to accurately determine the depth and location of substantially every point along the length of the streamer cable &:o provide more precise data. Since the early attempts to control the depth of the streamer cable, such as through the use of a single drogue assembly drawn behind the cable, or through the use of spaced weights and floats, considerable effort has been expended to control the cable depth at a desired point. Early approaches included placing a diving plane mechanism at spaced intervals along the length of the cable. The mechanism was mounted directly onto the cable by clamping two halves together with a series of nuts and bolts. These devices were time consuming and difficult to remove and replace. Similarly, external devices have been used to determine the areal location of points along the streamer cable with respect to the towing vessel. Attempts to accomplish this end have been made by attaching pinger devices externally to the cable much in the same manner as were the diving planes.

External cable connectors widely used in the industry have been manufactured by Laitram Corporation of New Orleans, Louisiana, and Syntron, Incorporated of Houston, Tex. These latching mechanisms for coupling devices external the seismic cable generally consist of collars mounted around the streamer cable at desired locations. Each collar may include two parts: a cylindrical inner race formed of two half-cylinder members which are semi-circular in cross-section coupled together by screws. The inner race receives an outer race or locking collar formed of two half-cylinder members which are also semi-circular in cross-section and coupled together by screws. The locking collar is free to rotate around the inner race. The locking collar has a detent consisting of a pair of locking slots at diametrically opposed positions. The locking slots are designed to slidably receive a screw set at a predetermined height on a shank or bracket coupled to the external device. The distance between the shank and the head of the screw is set so that the head of the screw will just be received by the locking collar and allowed to slide along an inner surface, leaving the shank substantially tight against the collar. The screw is slid to one end of the locking slot so as to enable a pin to be insert into the locking slot through the action of a cam or spring. Cams or levers have been provided to lower the pin and allow the shank to slide off the collar.

The cam operated pins in the mechanisms for coupling the external devices have the same problem as the diving planes. They require a tool to remove the shank from the collar. The spring operated pins have a disadvantage in that they provide a lever protruding from the side of the shank used to lower the pin which is exposed to ocean debris and may be inadvertently dislodged or lowered, allowing the shear stress inherent in such a system while under tow to be applied to the screw. This may result in failure of the latching mechanism and loss of the external device. Another disadvantage in the external lever or the spring-actuated latch is the turbulence generated do to their perpendicular orientation to the flow direction.

It is an object of this invention to provide a latching mechanism which does not require tools to attach or detach an external device to a streamer cable. It is another object of this invention to provide a latching mechanism which does not require tools to adjust the latching mechanism once the device has been attached and locked in place. It is yet another object of this invention to provide a latching mechanism which allows quick and efficient coupling and uncoupling of external devices. It is yet another object of this invention to provide a latching mechanism which is universally accepted by locking collars manufactured by others.

SUMMARY OF THE INVENTION

The instant invention is directed to an apparatus for rapidly securing a device external to a cable. In particular, the invention is an apparatus comprising a bracket or shank mounted to the device to be coupled to the cable. The bracket includes a detent extending from a coupling surface, laterally offset from a latching means disposed within the bracket. An end of the latching device and of the detent may be universally received within a locking bracket mounted on the cable. A lever, extending through the side of the bracket, from the latching device, may be turned once the end of the latching means and detent are received within an aperture of the locking bracket. The latching means is rotated which prevents the end of the latching means from escaping from the locking bracket. A biasing means associated with the latching means, simultaneously draws the bracket up tight against the locking bracket, firmly retaining the detent within the aperture of the locking bracket, transferring shear stress from the bracket and device to the cable. The bracket is detached by simply moving the lever in the opposite direction which releases the end of the latching means from the aperture in the locking bracket.

BRIEF DESCRIPTION OF THE DRAWING FIGURES

A better understanding of the benefits and advantages of my invention may be obtained from the appended detailed description and the drawing figures described below, wherein.

DETAILED DESCRIPTION OF PREFERRED EMBODIMENTS

Figure 1:
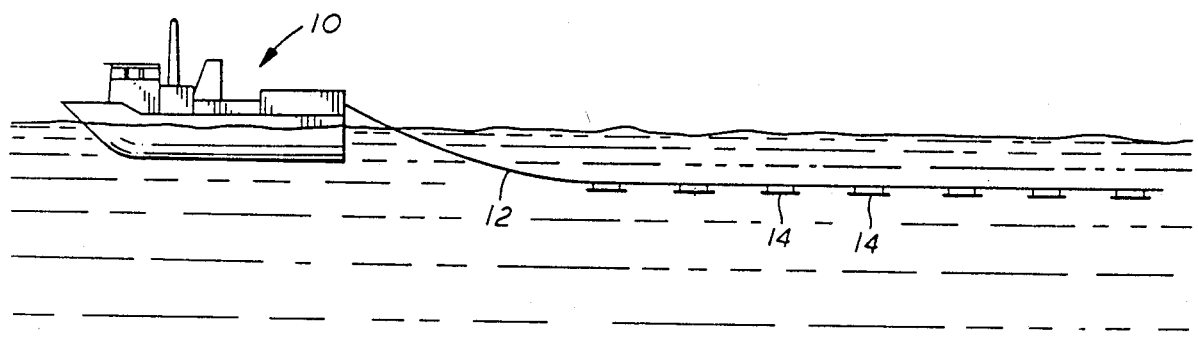
FIG. 1 is a general illustration of a marine seismic survey.

In reference to the Figures, one is on notice that like reference numerals indicate like components which may vary slightly in design but function in essentially the same manner.

FIG. 1 is a general illustration of a marine seismic survey. In such a survey technique, a ship 10 tows at least one seismic streamer cable 12 containing a plurality of seismic signal detectors disposed at known intervals along its length. The ship may tow several such streamer cables spaced parallel to one another and separated by predetermined distances controlled by booms or other devices well known in the art such as paravanes. The streamer cable often has external devices, generally indicated as 14, attached thereto such as diving planes to control the towing depth, or pingers used to determine the location and orientation of the streamer cable with respect to the ship. Often a combination of devices are attached at points along the length of the streamer cable.

Figure 2:
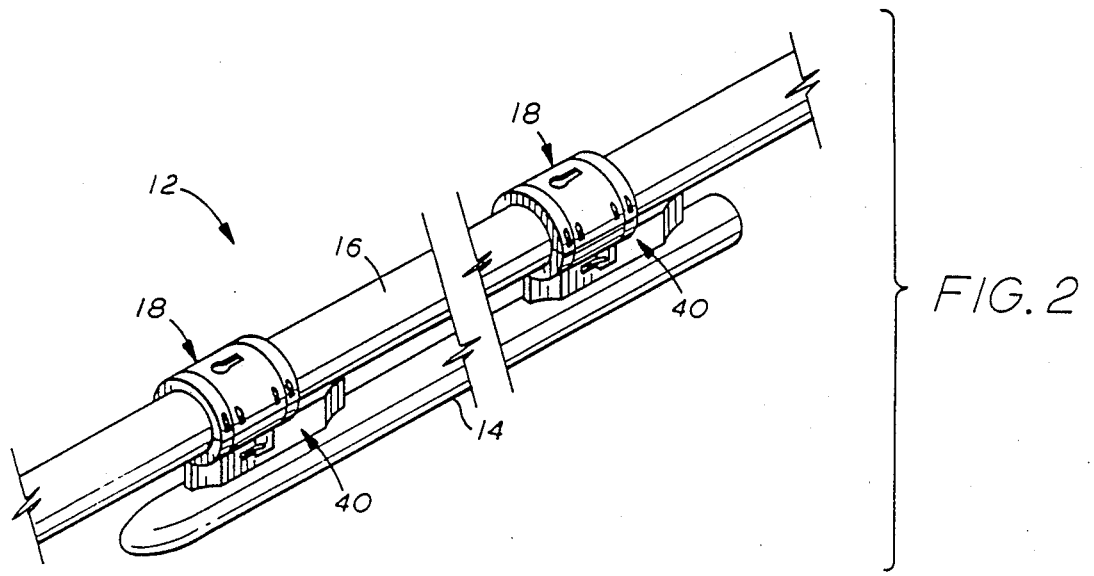
FIG. 2 is an enlarged view of a portion of the seismic cable having an external device attached thereto.

FIG. 2 is an enlarged view of a portion of the seismic cable having an external device 14 attached thereto. As shown in the Figure, the streamer cable 12 generally consists of a rubber tubular body 16 which encloses the sensors mentioned above, as well as their associated transmission lines and other components of the streamer cable. The exterior of the streamer cable body or skin 16 may have at least one, but preferably two, collars generally shown as 18 mounted thereon. The collars are mounted to the streamer cables after the cables themselves have been constructed. As mentioned earlier, various manufacturers supply the collars to the industry, usually associated with the respective device to be coupled to the cable exterior. Collars 18 from the different manufacturers are generally of the same design and may be made from plastics, stainless steel or other similar materials. Minor differences which do exist between particular manufacturer reside in the configuration and numbers of apertures designed to retain the coupling devices.

Figure 3:
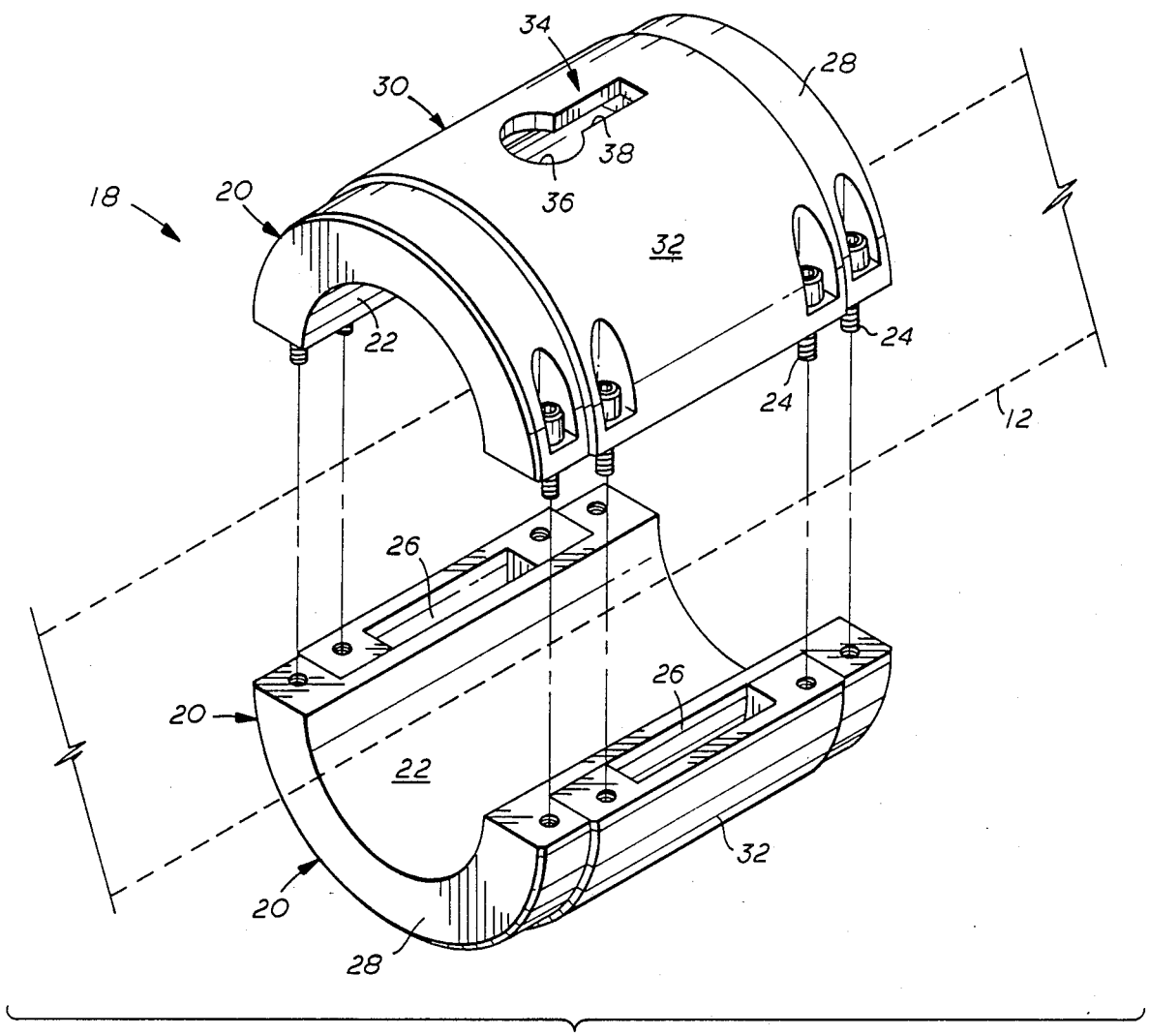
FIG. 3 is a general illustration of a locking collar.

As generally shown in FIG. 3, each locking collar 18 includes a cylindrical inner race 20 formed of two half-cylinder members 22 which are semi-circular in cross-section and mounted to each other by screws 24 or other suitable attaching means. The inner races 20 are mounted at desired positions with the streamer cable 12 and spaced from each other. The inner races 20 may be mounted over the cable 12 and held in place therewith by cement or by any suitable adhesive or between stops made from strips of tape wrapped around the cable exterior. The inner races 20 have reduced diameter center section 26 located between shoulders 28 located along the edge. The center section 26 of the inner races 20 is adapted to receive an outer race or locking collar 30.

The locking collar 30 is preferably formed of two half-cylinder members 32 which are semi-circular in cross-section and mounted to each other by screws 24 or other suitable attaching means. The locking collar 30 is free to rotate about the inner race 20. This allows any device attached to the collar to seek its lowest gravitational position below the streamer cable. The locking collar 30 usually contains a pair of opposing locking apertures 34, each consisting of a forwardly located circular socket 36 trailed by a generally rectangular slot 38. Each portion 36 and 38 of the locking aperture 34 is designed to receive a different part of the latching mechanism to be described below.

Figure 4:
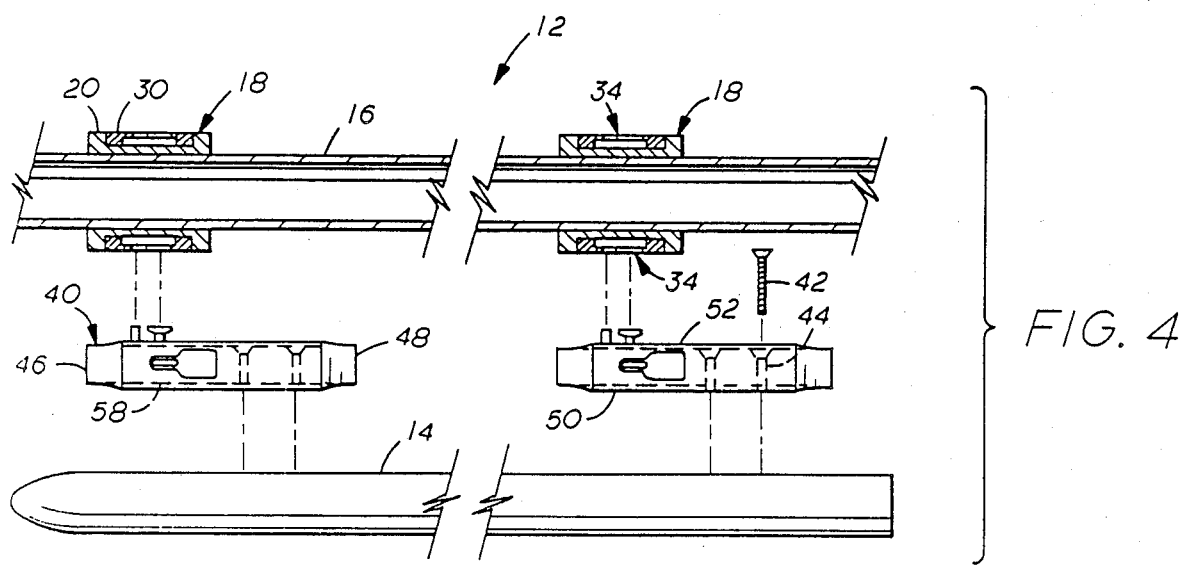
FIG. 4 is a elevational cross-sectional view of the inventive mechanism for coupling the external device to the streamer cable.

FIG. 4 is a elevational cross-sectional view of the inventive mechanism for coupling the external device to the streamer cable. Schematically shown in the upper half of the Figure is the streamer cable 12. Shown in cross-section along the streamer cable are a pair of the collars 18 generally showing the inner race 20 and the locking collar 30. Each locking collar 30, or bracket, is designed to receive another bracket or shank 40 which carries the device 14 to be coupled to the streamer cable 12. As seen in the Figure, each bracket 40 generally has a elongate block-like form and may be coupled to the device 14 by way of screws or bolts 42 passing entirely through holes 44 in the bracket. A leading and trailing edge of the bracket, 46 and 48 respectively, may be tapered to form a bow and stern portion for streamlining purposes. A lower surface 50 of the mounting bracket may be designed to conform to device 14 again for streamlining purposes. An upper surface 52 of the bracket 40 may be designed to have a slightly concave trough to conform to the curve of the locking collar 30. The bracket or shank 40 may be made from a polycarbonate plastic, stainless steel, or material of similar strength characteristics. For the purposes of this discussion, it is preferred that polycarbonate plastic be used for machining purposes.

Figure 5:
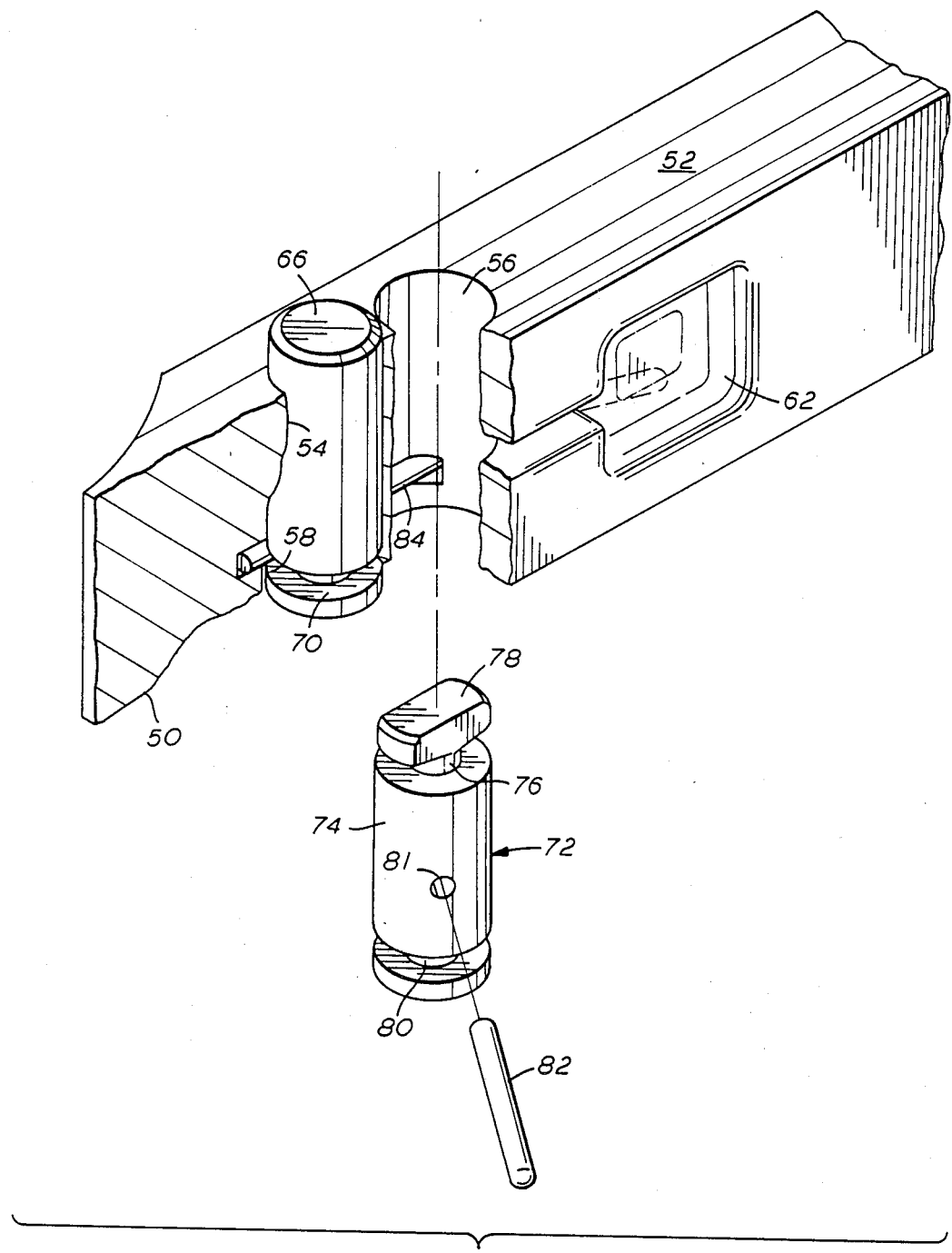
FIG. 5 is perspective view of the components comprising the invention.

FIG. 5 is a perspective cross-sectional view of the bracket 40 and the components comprising the invention. In one embodiment, at least one, but preferably a pair of closely spaced holes 54 and 56 may extend through the bracket 40 from the upper surface 52 to the lower surface 50. An elongate recess 58 may also be located along the lower surface 50 parallel to the length of the bracket and symmetrical with respect to the two holes. Holes 54 and 56 should be located along a center line C located down the length of the bracket 40. A transverse slot 60 may extend laterally in from one side of the bracket and intercept hole 56 furthest from the bow 46. The slot 60 may merge into a shallow depression 62 located along the exterior of the bracket slightly behind hole 56. An outer edge of the slot 60 may also contain a raised ridge or ramp 64 with the gradient decreasing from the bow to the stern of the bracket.

Shown in the hole 54 is a pin 66 of generally cylindrical form. The pin 66 has substantially the same diameter as hole 54 and may be constructed of stainless steel rod. The diameter of the upper end of the pin may not be greater than that of the socket 36 located in the locking collar 30. The lower end of the pin 66 may have an annular depression or channel 70 which is positioned adjacent the recess 58 in the lower surface of the bracket 40 when disposed in the hole 54. The pin 66 forms a projection or detent which extends above the upper surface 52 when properly positioned within hole 54 and is designed to transfer shear stresses to the collar 30.

Shown in the lower portion of FIG. 5 is a latching means or lock 72 having a substantially cylindrical form and having a diameter substantially the same as hole 56. As in the case of the pin 66, it is preferred that the lock 72 be made from stainless steel rod. One end of the lock 72 tapers inward from the cylindrical body 74 to form a shaft 76 terminating in a cross or T-shaped cam or flange 78 of generally rectangular form. The longest dimension of the cross 78 may be of any dimension, but for the purposes of this embodiment, is no greater that the diameter of the body 74. The shortest dimension of the cross 78 is substantially equal to that of the shaft 76, but in no event is greater than the width of the slot 38 contained within the locking collar 30. The opposite end of the lock 72 also defines an annulus 80 very similar to that in the pin 66, but with a minor exception. The annulus 80 tapers gradually inward, thus the break between the smallest diameter of the annulus and the lower tapered surface occurs slightly higher than it occurred in the pin 66. The reasons for this will become apparent below.

A transverse hole 81 is defined entering the body of the lock 72 to receive a lever 82 after the lock 72 is located within the hole 56. The lever 82 extends from the lock 72 through the slot 52 defined in the side of the bracket 40, thus providing a means for rotating the lock 72 within the hole 56. The lever 82, at its furthest rearward arc of travel, may be received in the depression 62.

A bar spring 84 may be located within the recess 58 so as to pass through the annular portions of both the pin 66 and the lock 72. The spring 84 retains the pin 66 within the hole 54 to provide rapid exchange if a different shape or diameter pin 66 is desired. The spring 84 more importantly provides a downward bias upon the tapered portion of the lock 72 to force the lock towards its lowermost position restrained only by the position of the lever in the slot 56.

In the embodiment discussed above, the lever 82 is shown simply as a bar or rod, but it is to be understood that the handle portion of the rod may have a form which substantially fills the depression 62 with the handle in the closed position (moved towards the stern) to provide maximum streamlining benefits.

In another embodiment of the invention, pin 66 may be an integral part of the bracket 40. That is to say that the projection may be directly molded or machined from the material comprising the bracket.

In a contemplated best mode of operation, the bracket or shank 40, having the device 14 coupled thereto, may be coupled to the locking collar 30 simply by initially rotating the lock 72 so that the longest dimension of the cross 78 is parallel to the length of the bracket 40. The upper surface 52 of the bracket is placed adjacent the locking collar 30 such that the pin 66 is received by the forward socket 36, and the cross 78 of the lock is received by the slot 38. Once they are within the locking aperture 34, the lever 82 is moved rearward until resting within the depression 62. The lever rotates the lock 72 such that the longest dimension of the cross portion 78 within the locking aperture 34 is substantially perpendicular to the longitudinal axis of the slot 38. As the lever is moved rearward (or forwards as the case may be) the decreasing gradient of the ramp 64 allows the tension of the spring 84 to draw the lock 72 and cross 78 downward upon the inner surfaces of the aperture 34, thus pulling the bracket 40 snugly against the collar 30. The downward action of the spring 84 also holds the pin 66 securely seated within the socket 36 and thereby transfers any shear stress to the streamer cable through the collar.

To detach the bracket 40 from the locking collar 30 the operator simply moves the lever outward to the forward most position. This removes the spring tension on the cross 78 and swings it parallel to the slot 38, allowing the cross to fall through the slot 38.

It is clear that the instant invention has applications far greater than in the field of seismic exploration. The coupling device may be used to couple pods to spacecraft, aircraft or submarines. The coupling mechanism may also be used for coupling equipment to racks or the like. The foregoing disclosure and description of the invention are illustrative and explanatory thereof, and various changes will occur to those skilled in the art in their respective fields which fall within the scope of this invention limited only by the restrictions called for in the specification and the appended claims.

I claim as my invention:

1. An apparatus for coupling a device to a marine cable, said apparatus comprising:
   (a) first mounting means fixed to said cable and having an aperture therein;
   (b) second mounting means fixed to said device including pin means and a locking means each adapted for engaging said aperture of said first mounting means, said locking means further comprising:
      (1) a cylinder having a second end disposed within said second mounting means adjacent and parallel to said pin means, and a first end extending from the second mounting means to engage the aperture;
      (2) cam means defined at the first end of the cylinder;
      (3) means engaging said second end of the cylinder for exerting a tensional force upon the cylinder within the second mounting means; and
   (c) means for rotating said locking means thereby placing the cam in a locked and unlocked position within the aperture, for detachably coupling said device to said cable.

2. An apparatus for detachable coupling a submersible device to a seismic cable, comprising:
   (a) first mounting means having at least one detent defined therein, coupled about a circumference of said seismic cable;
   (b) second mounting means having a latching means adapted to be received by said detent and coupled to said submersible device, the latching means further comprising;
      (1) a pin extending from the second mounting means;
      (2) a cylinder disposed within the second mounting means parallel and adjacent to the pin, and having an end extending from the second mounting means;
      (3) a cam defined at the end of the cylinder for receipt within the detent; and
   (c) means for rotating said cylinder thereby turning the cam within the detent to lock and unlock said submersible device to said seismic cable.

3. An apparatus for attaching a external submersible device to a marine seismic streamer cable to be towed through a body of water, comprising:
   (a) a receiving collar having at least one detent defined therein and fixed to said marine seismic streamer cable, said detent having a first and a second portion;
   (b) a mounting bracket fixed to said external submersible device, the mounting bracket having a stress member extending therefrom and adapted to engage the first portion of the detent and a locking member extending therefrom parallel and adjacent to the stress member and adapted to be received by and engage said second portion of the detent in said receiving collar; and
   (c) means, operably connected to said locking member, for rotating said locking member into a locked position after said locking member engages said detent in said receiving collar.

4. The apparatus as recited in claim 1, further comprising means for retaining said locking means within said second mounting means.

5. The apparatus as recited in claim 1, further comprising means for retaining said pin means within said second mounting means.

6. The apparatus as recited in claim 1, wherein said first mounting means comprises a first bracket adapted to be coupled to said marine cable.

7. The apparatus as recited in claim 1, wherein said second mounting means comprises a second bracket adapted to be coupled to said device, said pin means and locking means located on said second bracket so as to engage said aperture.

8. The apparatus as recited in claim 1, wherein said pin means comprises a cylinder disposed within said second mounting means, and received and seated in said aperture.

9. The apparatus as recited in claim 1, wherein said pin means comprises a lug extending from a surface of said second mounting means, and received and seated in said aperture.

10. The apparatus as recited in claim 1, wherein said means for rotating said locking means comprises lever means extending from said locking means through a slot to an exterior of said second mounting means.

11. The apparatus as defined by claim 1, wherein said cam means comprises a substantially rectangular flange perpendicular to a shaft with an axis concentric with the cylinder and having a diameter substantially equal to said aperture.

12. The apparatus as defined in claim 1, wherein said aperture in said first mounting means has circular and rectangular portions.

13. The apparatus as recited in claim 2, wherein said first mounting means comprises:
    (a) an inner collar defining an inner race, said inner collar having first and second semi-circular half that couple with each other about said seismic cable;
    (b) an outer race defining a locking collar, said locking collar having a first and second semi-circular half that couple about said inner race and freely rotate thereabout along a single axis, each of said halves of said locking collar having said at least one detent therein; and
    (c) means for interconnecting said first and second half of said inner collar about said seismic cable, and said locking collar about said inner collar.

14. The apparatus as recited in claim 2, wherein said second mounting means coupled to said submersible device comprises:
    (a) an bracket having a lug, a bow, and a stern portion, at least one vertical hole for receiving said latching means, a slot extending through a side of said bracket and in communication with said hole for receiving said rotating means, and a depression located in said side of said bracket including an end of said slot;
    (b) means for coupling said bracket to said submersible device; and
    (c) means for retaining and placing a tensional stress upon said latching means within said bracket.

15. The apparatus as recited in claim 14, wherein said means for rotating said latching means comprises a lever transversely extending from said cylinder.

16. The apparatus as defined in claim 14, wherein said cam means comprises a flange oriented perpendicular to a concentric shaft having a diameter substantially equal to said detent.

17. The apparatus as defined in claim 13, wherein said at least one detent in said locking collar comprises a first portion and a second portion.

18. The apparatus as defined in claim 17, wherein said first portion of said detent is generally circular, and said second portion of said detent is generally rectangular having a longitudinal axis parallel to a radial of said circular portion.

* * * * *